(12) United States Patent
Kransmo

(10) Patent No.: US 6,594,242 B1
(45) Date of Patent: Jul. 15, 2003

(54) BROADCASTING OF TWO GENERATION CELLULAR SYSTEM CONTROL CHANNEL INFORMATION OVER A THREE GENERATION CONTROL CHANNEL TO SUPPORT ROAMING AND HANDOVER TO TWO GENERATION CELLULAR NETWORKS

(75) Inventor: Jan L. Kransmo, Plano, TX (US)

(73) Assignee: Ericsson, Inc., Richardson, TX (US)

( * ) Notice: Subject to any disclaimer, the term of this patent is extended or adjusted under 35 U.S.C. 154(b) by 0 days.

(21) Appl. No.: 09/231,844

(22) Filed: Jan. 14, 1999

(51) Int. Cl.[7] .............. H04Q 7/00; H04Q 7/20; H04B 7/216
(52) U.S. Cl. ............. 370/331; 370/335; 455/437
(58) Field of Search ................ 370/831–834, 370/352, 342; 455/552, 553, 436–444, 450–452, 434, 517

(56) References Cited

U.S. PATENT DOCUMENTS

| | | | | |
|---|---|---|---|---|
| 5,793,757 A | * | 8/1998 | Uddenfeldt | 370/335 |
| 6,031,831 A | * | 2/2000 | Tan Boon et al. | 370/342 |
| 6,061,338 A | * | 5/2000 | O | 370/335 |
| 6,131,030 A | * | 10/2000 | Schon et al. | 455/438 |
| 6,188,900 B1 | * | 2/2001 | Ruiz et al. | 455/436 |
| 6,198,937 B1 | * | 3/2001 | DeClerck et al. | 455/517 |
| 6,230,005 B1 | * | 5/2001 | Le et al. | 455/414 |
| 6,363,252 B1 | * | 3/2002 | Hamalainen et al. | 455/436 |
| 6,374,112 B1 | * | 4/2002 | Widegren et al. | 370/352 |
| 6,396,827 B1 | * | 5/2002 | Paivike et al. | 370/347 |
| 6,466,556 B1 | * | 10/2002 | Boudreaux | 370/331 |
| 6,493,332 B1 | * | 12/2002 | Hirade | 370/342 |
| 6,501,953 B1 | * | 12/2002 | Braun et al. | 455/436 |

FOREIGN PATENT DOCUMENTS

| WO | WO-00/42808 | * | 7/2000 |
|---|---|---|---|

* cited by examiner

*Primary Examiner*—Tracy Legree

(57) ABSTRACT

A method, node and wireless communication terminal for providing handover and roaming from a 3G communication system to a 2G communication system. A dual-mode wireless terminal operating in a 3G communication system may obtain control channel information regarding a 2G communication system, and switch service as a function of the control channel information received. The method includes the step of providing control channel information for the 2G communication system over a downlink control channel of the 3G communication system to the wireless terminal. The node includes a means to communicate with the wireless communication terminal and a means providing control channel information of a second generation (2G) communication network over a downlink control channel at the 3G communication network. The wireless communication terminal includes a transceiver capable of communicating with a node of both a third generation (3G) wireless communication network and a second generation (2G) wireless communication network, and a control means coupled to the receiver for receiving and identifying control channel information indicative of the 2G communication network from a downlink control channel at the 3G communication network.

10 Claims, 1 Drawing Sheet

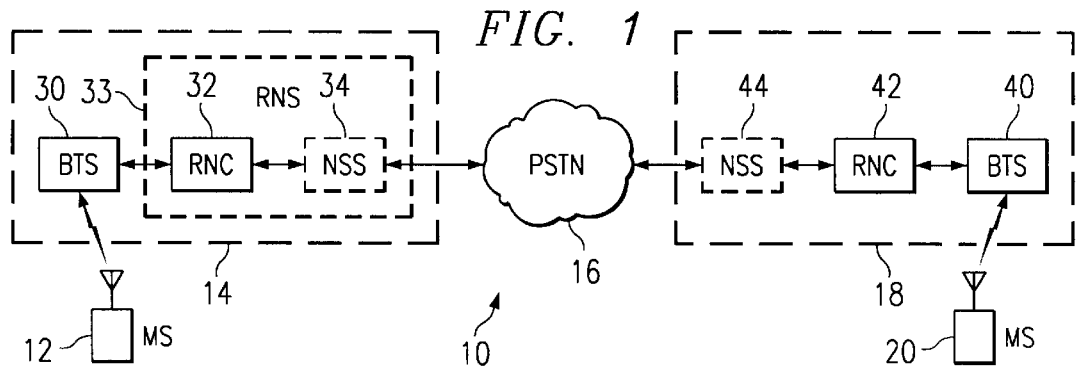
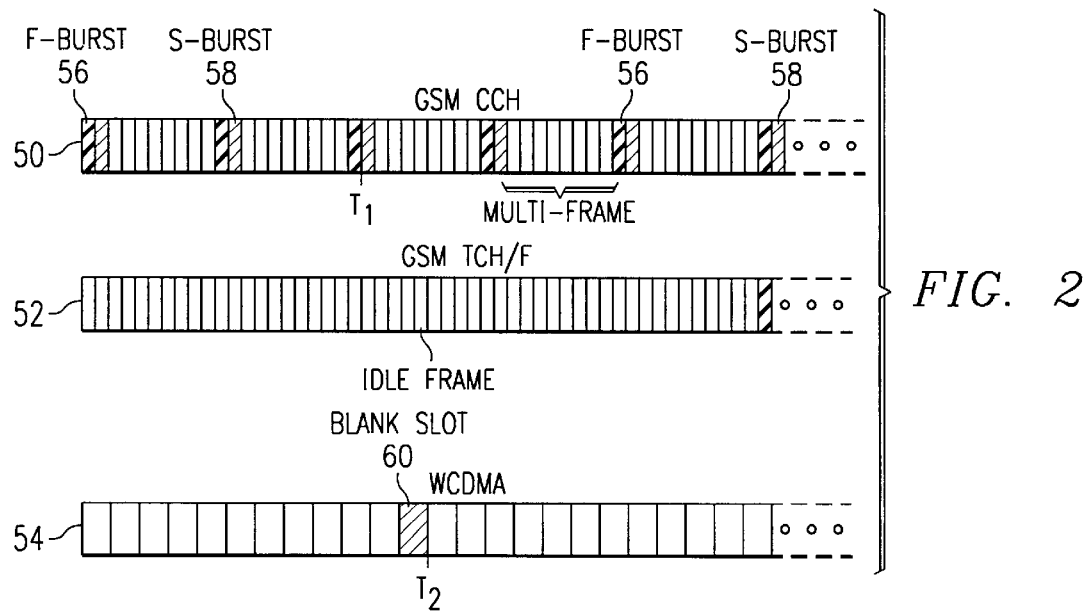

BROADCASTING OF TWO GENERATION CELLULAR SYSTEM CONTROL CHANNEL INFORMATION OVER A THREE GENERATION CONTROL CHANNEL TO SUPPORT ROAMING AND HANDOVER TO TWO GENERATION CELLULAR NETWORKS

TECHNICAL FIELD

This invention relates generally to wireless communication networks, and more particularly to roaming and handover from a Wideband Code Division Multiple Access (WCDMA) third generation (3G) network to a Two Generation (2G) network.

BACKGROUND OF THE INVENTION

Wireless communication networks including fixed wireless and cellular-type mobile communications networks continue to evolve. There are several available technologies for providing wireless communications including Code Division Multiple Access (CDMA), Time Division Multiple Access (TDMA), Global System for Mobile Communications (GSM), Advanced Mobile Phone System (AMPS) and Digital AMPS (D-AMPS) (IS-136 TDMA). These networks continue to be deployed throughout the world. Many equipment suppliers currently manufacture these various systems and typically work through standards groups to ensure commonality and inter-operability of the various networks.

As wireless communications networks move into the 21 st century, a new type of wireless network is evolving currently known as Wideband Code Division Multiple Access (WCDMA) or Wideband Packet Code Division Multiple Access (WPCDMA) based third generation (3G) networks. These third generation wireless systems are slowly becoming a reality for Future Public Land Mobile Networks (FPLMNs). When 3G networks are implemented, service coverage may be implemented gradually, for example, by migrating slowly from 2G to 3G. Initially, 3G coverage may be limited, with a possibility of drop-outs due to lack of coverage in certain geographical locations. To prevent this, dual-mode wireless mobile terminals will be available that operate in both 2G and 3G systems.

There is a desire to intelligently handover and provide roaming from a 3G network to a 2G network, for example, when a 3G network becomes unavailable or is not accessible in a mobile user's physical location.

SUMMARY OF THE INVENTION

The present invention achieves technical advantages as a method and node for providing handover and roaming of a wireless terminal from a 3G communication system to a 2G communication system, and further including a wireless communication terminal capable of the same. The present invention provides the ability of a dual-mode wireless terminal operating in a 3G communication system to obtain control channel information regarding a 2G communication system, and to switch service as a function of the control channel information received.

In one embodiment, disclosed is a method of supporting handover and roaming of a wireless terminal from a third generation (3G) communication system to a second generation (2G) communication system, comprising the step of providing control channel information for the 2G communication system over a downlink control channel of the 3G communication system to the wireless terminal.

In another embodiment, disclosed is a node in a third generation (3G) wireless communication network communicable with a wireless communication terminal, comprising a means to communication with the wireless communication terminal and a means providing control channel information of a second generation (2G) communication network over a downlink control channel at the 3G communication network.

Also disclosed is a wireless communication terminal, comprising a transceiver capable of communicating with a node of both a third generation (3G) wireless communication network and a second generation (2G) wireless communication network; and a control means coupled to the receiver for receiving and identifying control channel information indicative of the 2G communication network from a downlink control channel at the 3G communication network.

Advantages of the present invention include the prevention of drop-outs and faster switch-overs from a 3G network to a 2G network due to faster synchronization between networks. Rather than searching through 100–400 frequencies looking for a synchronization channel (SCH) burst in a 2G GSM network, a wireless mobile station is provided with the channel control information by the 3G network and thus finds the SCH in 1–10 tries, for example, reducing switch-over time 100-fold. Surge times of the wireless mobile station are improved with the present invention, resulting in increased efficiency, e.g., more bandwidth is allocatable for data transmission, and also resulting in power savings for the wireless mobile station, which is especially beneficial for battery-powered wireless mobile terminals.

BRIEF DESCRIPTION OF THE DRAWINGS

The above features of the present invention will be more clearly understood from consideration of the following descriptions in connection with accompanying drawings in which:

FIG. 1 is a block diagram of a wireless communication network including a WCDMA wireless network for third generation systems;

FIG. 2 illustrates a block diagram of the timing of a 3G and 2G network of the present invention; and FIG. 3 shows a block diagram of a downlink control channel containing 2G system information (2G Control Channels) in accordance with the present invention.

Corresponding numerals and symbols in the different figures refer to corresponding parts unless otherwise indicated.

DETAILED DESCRIPTION OF PREFERRED EMBODIMENTS

FIG. 1 illustrates a block diagram of a communication network 10 according to a preferred embodiment of the present invention. Communication network 10 preferably comprises a wireless telephony network seen to include an originating mobile station (MS) 12 coupled by a Radio Frequency (RF) communication link to a servicing WCDMA originating network 14. The originating MS 12 is preferably a wireless communication device comprising a wireless cellular-type mobile station, such as a Personal Communications Service (PCS) or cellular phone, but may also include a computer, a Personal Digital Assistant (PDA), or other wireless terminal, for example. The originating WCDMA network 14 is seen to be coupled to a transit network or communication link 16, which may comprise a Public Switched Telephone Network (PSTN), but could also comprise other networks including an optical network if desired. The transit network 16 interfaces and communicates electrical signals including digitized voice calls between originating network 14 and a terminating network 18. Terminating network 18 may be the same as, or different than, the originating network 14, and may comprise AMPS, D-AMPS, TDMA, CDMA, GSM and IS-95 networks. For purposes of illustration, terminating network 18 is depicted as a WCDMA network. Terminating network 18 is coupled to and services via an RF link a terminating Mobile Station (MS) 20, which may comprise a fixed or mobile station such as a wireless cellular or PCS subscriber. The wireless stations and networks may have codecs to provide encoding and decoding of digital signals communicated over the transit network 16.

The originating WCDMA network 14 is seen to include a Base Transceiver Station (BTS) 30 serving via an RF link the originating mobile or fixed station 12. Each BTS 30 services multiple MSs 12, although only one is shown for purposes of illustration and clarity. Originating network 14 is further seen to include a Radio Network Controller (RNC) 32 and a Network Switching System (NSS) 34. The BTS 30 and RNC 32 are sometimes collectively referred to as a Radio Network System (RNS) 33. RNC 32 interfaces voice calls between multiple BTSs 30 and NSS 34, wherein RNC 32 typically serves multiple BTSs 30, although only one is shown for purposes of illustrating the present invention. Similarly, NSS 34 services multiple RNCs 32, although only one is shown for purposes of illustration. NSS 34 includes a Home Location Register (HLR), a mobile positioning node, and a Visitor Location Register (VLR) which includes and stores various information of the MSs 12 currently being served by the originating network 14.

Terminating network 18 is seen to include a BTS 40 serving the terminating station 20, and typically serves MSs 20. Terminating network 18 is further seen to include a RNC 42 and NSS 44. Terminating network 18 may operate according to the same operating protocol as originating network 14, i.e., both are WCDMA networks, or, the terminating network 18 may be different from the originating network 14, i.e., the originating network is WCDMA and the terminating network may be based on AMPS, D-AMPS, GSM, TDMA or IS-95 protocols, for example. In these types of networks, a Base Switching Center (BSC) and Mobile Switching Center (MSC) perform similar functions to that of the NSS 34 and RNC 32, in a WCDMA network, respectively. NSS 44 includes a HLR, and a VLR for maintaining a register of information for all MSs 20 currently being served by the terminating network 18.

Transit network 16 is preferably a PSTN. Originating NSS 34 and terminating NSS 44 exchange digitized voice data thereover, which are preferably encoded in Pulse Code Modulation (PCM) format, and transmitted at about 64 kbps. Although PCM is a preferred encoding format, other encoding formats are available according to the present invention. Likewise, other transfer speeds other than 64 kbps are also contemplated by the present invention. Generally, the digitized voice data transferred over transit network 16 can be in any format which is compatible with and supported by both the originating network 14 and the terminating network 18.

In 3G WCDMA networks, especially when 3G networks are first implemented, MS 12 may comprise a dual mode mobile terminal, capable of being used in both 3G and 2G networks. A problem with switching over (during roaming or handover) from a 3G to a 2G network is that the two networks are not synchronized. A dual mode MS 12 requires the knowledge of the control channel frequencies upon which to measure in the 2G system, in order to perform roaming and handover from a 3G network to a 2G network. In most 2G systems, there are upwards of 300 frequencies/channels at which control channels may be transmitted, not necessarily at fixed assigned frequencies. In a GSM the control channel frequency varies and is chosen by the service provider, whereas with some PCS networks such as IS 136, the control channels are fixed at specific frequencies.

Without a means for communicating the location of the control channel to the MS 12 from the 3G network communication as with the present invention, the MS 12 is required to search all 300 frequencies and channels of the 2G network to find an Synchronization Channel (SCH). The search for the control channel frequencies may take 5 ms to 600 milliseconds, which is highly inefficient, increasing the chance of drop-out, and requiring a long surge time, which uses a lot of power, draining the battery or power supply of the MS 12.

Once the control channel frequency is determined, the MS 12 takes measurements of the carrier channels such as signal strength, and reads information from that carrier, such as who operates the 2G network, through, e.g., Base Station Identity Code (BSIC). The MS 12 also determines if the correct cell has been selected (rather than being effected by co-channel interference). Once measurements are made, handover and roaming may take place by measuring and ranking the signal strength in order and determining upon which channel to transfer the transmission across.

Referring now to FIG. 2, therein is shown a block diagram of a communication format that shows the timing of WCDMA timeframes 54 and GSM TDMA timeframes 50 and 52, illustrating how a 3G mobile terminal can synchronize with a GSM carrier based on the frame timing in order to handover or roam, in accordance with an embodiment of the present invention. The two types of GSM logical channels are shown, control channel (CCH) 50 having various frames such as F-burst 56, S-burst 58, and multiframe, as shown, and traffic channel (TCH) 52. The F-burst 56 is the Frequency Correction Channel (FCCH), a data burst occupying TS 0 for the first GSM CCH 50 frame which is repeated every ten frames within a control channel multiframe, that allows each MS 12 to synchronize is internal frequency standard to the frequency of the RNS 33. The synchronization S-burst 58 is the Synchronization Channel (SCH), a burst broadcast in TS 0 of the frame immediately following the frequency correction F-burst 56 that is used to identify the serving base station while allowing each MS 12 to frame synchronize with the base station. The present invention provides the necessary information for a MS 12 to locate the S-burst 58 of GSM CCH 50, perform measurements on the 2G carrier bandwidth, and synchronize with the blank slot 60 of WCDMA 54, allowing information to be obtained by MS 12 regarding the neighboring cell description, in a 2G network.

In GSM networks, the control channels are generally not standardized at fixed frequencies. For illustrative purposes, FIG. 2 shows an implementation of the present invention in use with a GSM 2G system. AMPS systems such as IS-136, which have control channels at fixed specific frequencies, and other configurations of wireless communication networks also benefit from the present invention.

Referring now to FIG. 3, therein is shown an embodiment of the present invention, with a downlink control channel in the 3G network containing 2G system information, more specifically containing 2G control channel information. Data package 64 is the burst sent from the RNS 33 in one of the sixteen 0.625 ms slots available in a 3G (WCDMA) network. 2G network Control Channel information 62 is preferably contained in the Broadcast Control Channel (BCCH), as shown. The sixteen slots create a 10 ms timeframe ($T_f$) 66, and 72 of the timeframes 66 create a 720 ms superframe ($T_{super}$) 68, as shown, in a WCDMA network.

The MS 12 of the present invention synchronizes 3G network information to 2G network in order to provide handover or roaming to a 2G network. Referring again to FIG. 2, for example, the slots to the right of blank slot 60 and $T_2$ of WCDMA timeframe 54 may be blank slots. With the present invention, the MS 12 compresses transmission to leave the blank slots idle and align $T_2$ with $T_1$ of GSM CHH 50 timeframe. $T_1$ information is contained in the 2G CC information 62 (of FIG. 3).: By aligning $T_2$ with $T_1$, the MS 12 synchronizes 3G with the 2G network transmission, giving the MS 12 the time in which to perform measurements in order to handover or roam from the 3G network to the 2G network. The uplink may be structured in the same manner as the downlink, in the present invention.

The novel method, node and wireless communication terminal (MS 12) of the present invention provide the advantage of reduced surge time of the MS 12, preventing transmission drop-outs and conserving power, e.g., battery usage. Furthermore, the quality of the transmission is.improved because it is no longer necessary to search 100–400 frequencies for the S-burst 58 control channel information. Rather, with the present invention, the control channel information is provided regarding a 2G communication system within a downlink control channel of the 3G communication system to the wireless terminal. The number of frequencies required to be searched by the MS 12 is reduced to 1–10, or a number determined by the service provider. By reducing the time required to search for the control channel frequency, more time is available for data transmission.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the present invention is preferably implemented in the node that provides the neighboring cell information as an inter-system control channel information message. The present invention is preferably implemented in the RNS 33 of the 3G network. It is seen that certain 2G system information must be provided in accordance with the present invention, in the 3G downlink. For example, with a GSM, the neighboring cell descriptions may contain the System Information 2, 2bis, 2ter, 5, 5bis and/or 5ter. With IS 136, for the primary and secondary control channel handovers, an indicator may be required to show which is used in the 2G network. It is therefore intended that the appended claims encompass any such modifications or embodiments.

What is claimed is:

1. A method of supporting handover and roaming of a wireless terminal from a third generation (3G) communication system to a second generation (2G) communication system, comprising the steps of:
   providing control channel information for said 2G communication system over a downlink control channel of the 3G communication system to the wireless terminal;
   performing measurements on said 2G communication system bandwidth utilizing said control channel information;
   determining a synchronization signal in said control channel information; and
   synchronizing said 2G communication system with said 3G communication system utilizing said synchronization signal.

2. The method as specified in claim 1 further comprising the step of the wireless terminal monitoring the 3G communication system control channel.

3. The method as specified in claim 2 further comprising the step of switching service to the 2G communication system as a function of said control channel information received.

4. The method as specified in claim 1 wherein said control channel information is provided over a Broadcast Control Channel (BCCH).

5. The method as specified in claim 1 wherein said 2G communication system is selected from the group consisting of: CDMA, TDMA, GSM, AMPS and D-AMPS and said 3G communication system is a WCDMA communication system.

6. The method as specified in claim 1, wherein the step of providing control channel information for said 2G communication system over a downlink control channel further comprises the step of receiving and identifying control channel information indicative of the 2G communication system for determining whether to synchronize with said 2G communication system.

7. The method as specified in claim 1, wherein said 2G communication system is a GSM communication system and said 3G communication system is a WCDMA system, said GSM communication system
   generating a frequency burst to enable said dual mode wireless terminal to synchronize said terminal's internal frequency with said GSM communication system and a synchronization burst for identifying a serving base station In said GSM network; and
   said dual mode wireless terminal detecting said synchronization burst and synchronizing said terminal with said GSM communication system.

8. A wireless communication terminal, comprising:
   a transceiver capable of communicating with a node of both a third generation (3G) wireless communication system and a second generation (2G) wireless communication system;
   control means coupled to said transceiver for receiving and Identifying control channel information indicative of the 2G communication system from a downlink control channel at the 3G communication system;
   means for performing measurements on said 2G carrier bandwidth utilizing said control channel information;
   detector means for detecting a synchronization signal in said control channel information; and
   synchronization means for synchronizing said wireless terminal with said 2G communication system.

9. The terminal as specified in claim 8 wherein said 2G communication system is selected from the group consisting of: CDMA, TDMA, GSM, AMPS and D-AMPS and said 3G communication system is WCDMA.

10. The terminal of claim 8 wherein said terminal is a dual-mode wireless terminal.

* * * * *